Jan. 28, 1958   W. V. SPURLIN   2,821,292
TORSION BAR MOUNTED VIBRATORY MOTORS
Filed Dec. 29, 1953   4 Sheets-Sheet 1
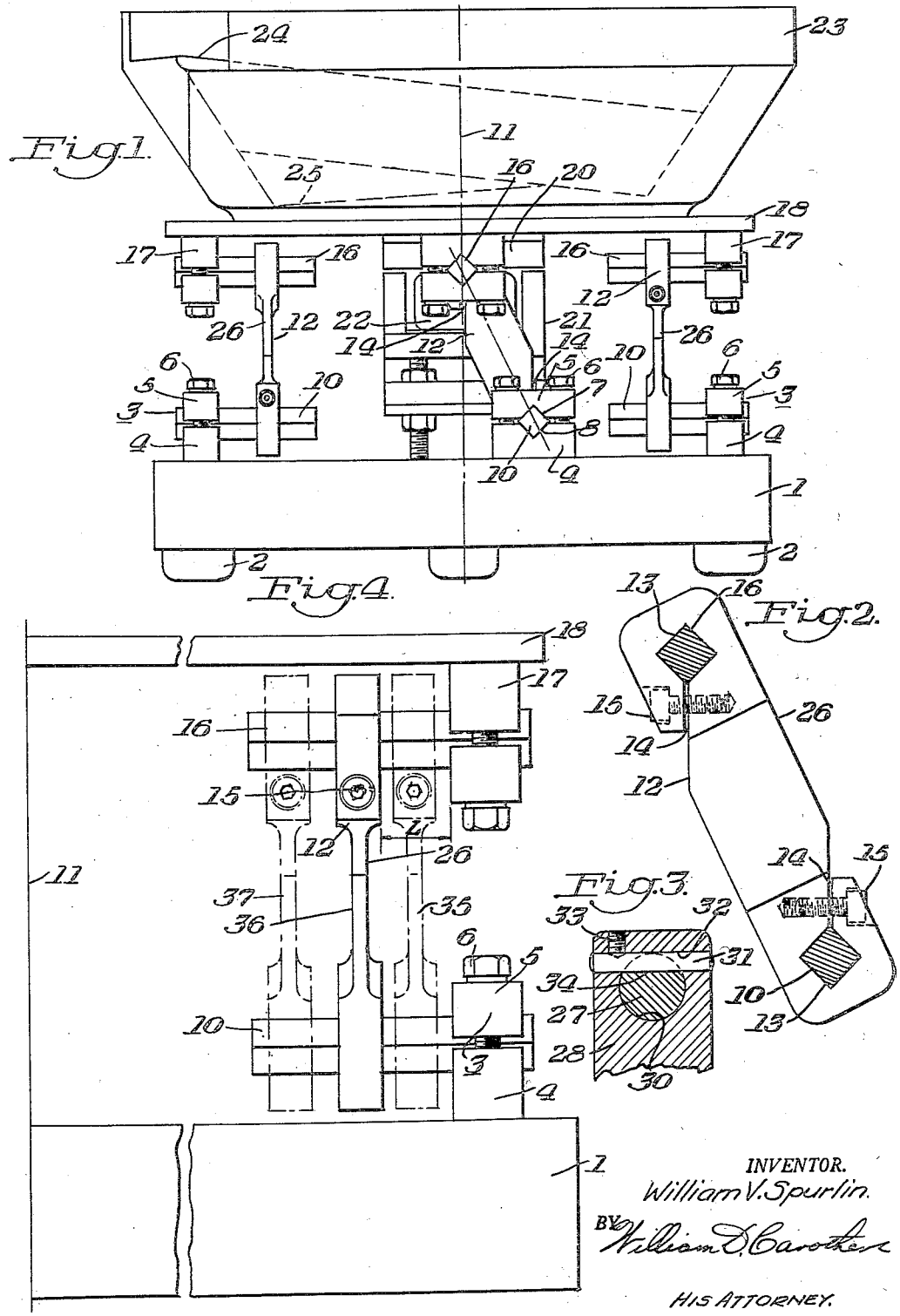
INVENTOR.
William V. Spurlin.
BY
William D. Carothers
HIS ATTORNEY.

Jan. 28, 1958 W. V. SPURLIN 2,821,292
TORSION BAR MOUNTED VIBRATORY MOTORS
Filed Dec. 29, 1953 4 Sheets-Sheet 2
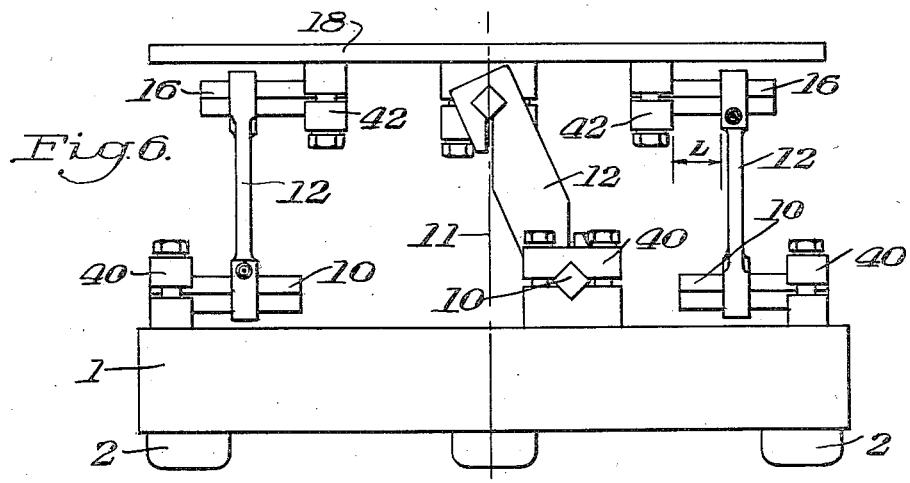
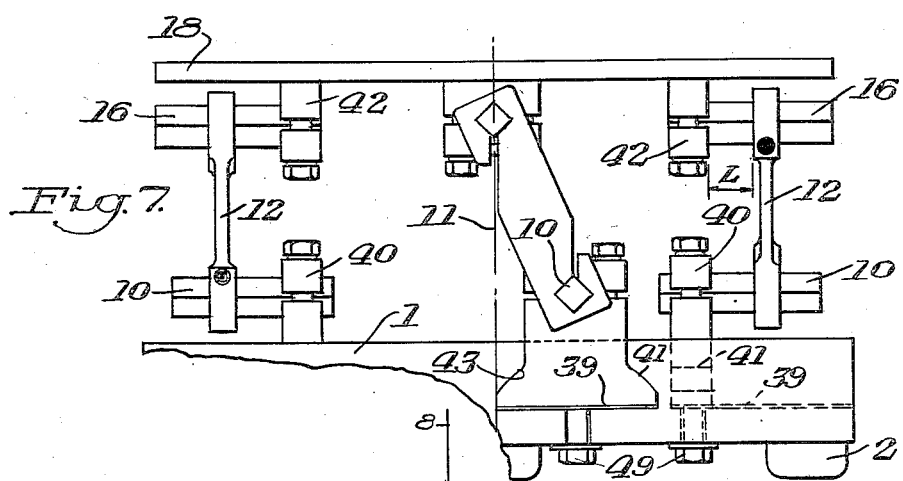
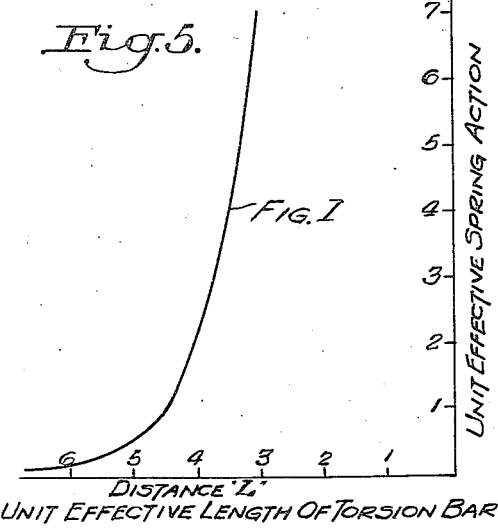
INVENTOR.
William V. Spurlin.
BY
HIS ATTORNEY.

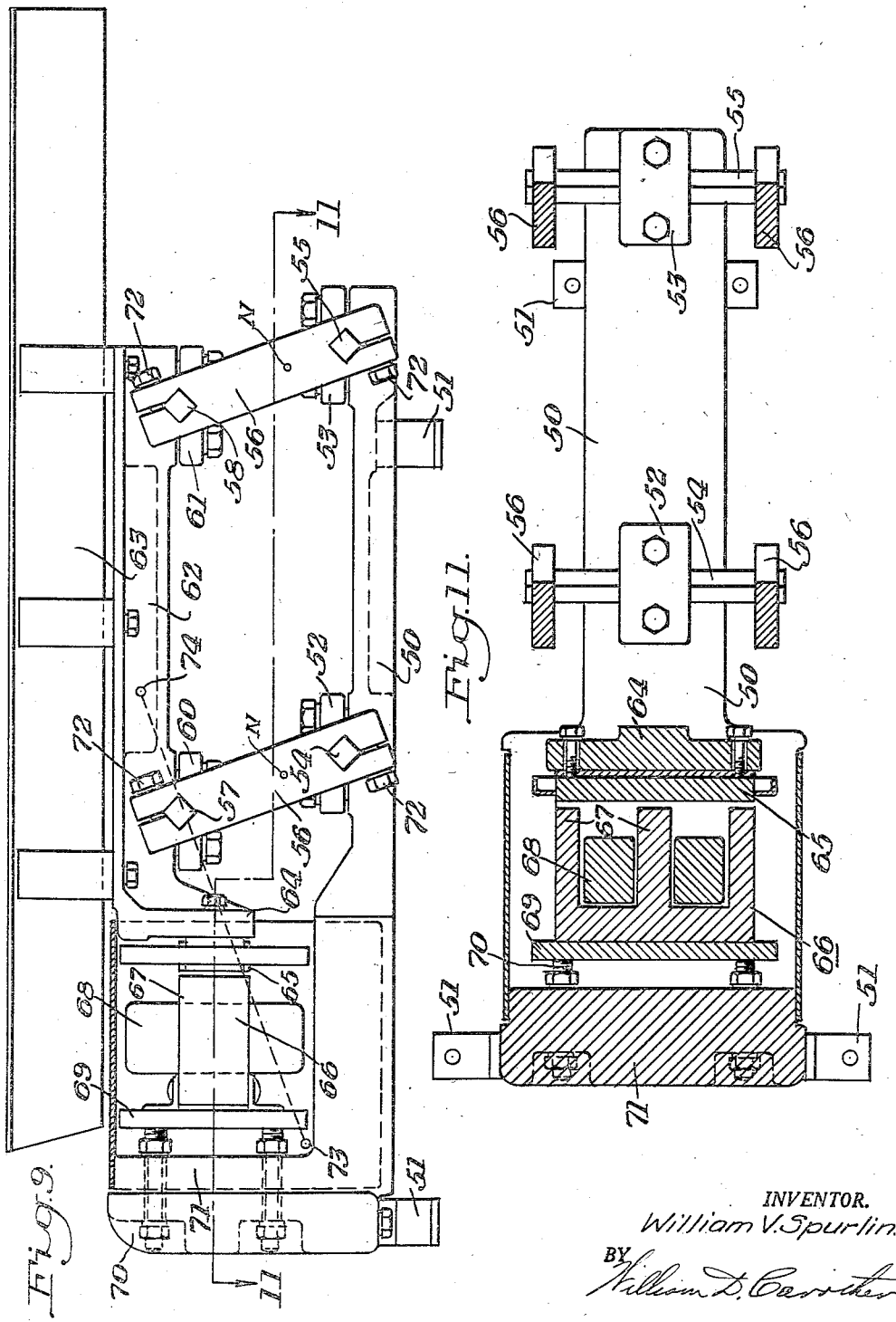

United States Patent Office 2,821,292
Patented Jan. 28, 1958

2,821,292

TORSION BAR MOUNTED VIBRATORY MOTORS

William V. Spurlin, Indiana, Pa., assignor to Syntron Company, Homer City, Pa., a corporation of Delaware Application December 29, 1953, Serial No. 400,955

13 Claims. (Cl. 198—220)

This invention relates generally to vibratory motors for material handling devices and more particularly to torsion bar supported vibratory motors.

Vibratory motors of this character are used to support feeders of different character such as straight feeders, feeder bowls having spiral conveying track on the inner wall of the bowl, or for helical conveyors, or for packing and jolting paper or material in containers and other similar applications.

These motors usually employ sloping leaf springs or rod springs to flexibly support a frame or plate on which the material handling device is mounted.

The motors for straight feeders and conveyors have their torsion bars mounted parallel to each other but the circular motors for parts feeders, feeder bowls and helical conveyors have their torsion bars mounted radially around a vertical central axis. In each instance the torsion bars provide the flexible support of the member or feeder to be vibrated.

The axes of the torsion bars on the circular motor are symmetrically distributed and extend outwardly from a common center or they may be disposed on radial lines, or they may be tangent to circles concentric to the common axis. The axes of the torsion bars lie in parallel horizontal planes.

The torsional bars for both the straight and circular motor may be of round or non-round cross section. Both forms offer a variety of modes for securing them to the frame or mounting plate and for securing the connecting arms thereto.

One of the principal objects of this invention is the provision of two sets of torsion bars for each motor whether it is a straight or circular motor. One set of torsion bars is adjacent the conveyor and another set is adjacent the base. Connecting arms are adjustably secured at their ends to both sets of bars thereby dividing the torsional load between the upper and the lower set of torsional bars.

One set of symmetrically positioned torsional bars may be employed as the support for the vibratory device, however, the provision of two sets of torsion bars permits the division of the torsion load and increases the opportunity for obtaining fine adjustment of the vibratory system for tuning the same. By employing two series of torsion bars, the mounting of the connecting arms is also simplified.

With only one set or series of torsion bars the connecting arms may be resiliently mounted to the base member or to the frame or mounting plate member according to choice made and the other end of the member then carries clamping means for the torsion bars.

When employing only one series of torsion bars the axes of the bars lie in a horizontal plane parallel with the base and the relative lengths of the torsion bars are adjusted for tuning by varying the relative position of the clamping means relative to the center of the motor and relative to the connecting arm.

When two sets of torsion bars are employed to support the system the connecting arms are adjustably secured between pairs of these torsion bars, one end of each arm being attached to an upper set and the other end to a lower set of torsional bars and both sets of bars are adjustably clamped relative to the plate and the base members as well as to the connecting arms. Thus a fine adjustment may be made by moving the bars relative to their clamping sockets or moving the arms relative to the bars. Either or both of these adjustments provides wide adjustment range.

The cross sectional size of the torsion bar together with its length determines the tuning of the bar. This length may be measured by the distance between the connecting arm and the clamping sockets.

In the manufacture of feeders it is economically desirable to limit the number of different sizes of motors. Each motor size is designed to carry its group of sizes which make up a complete consecutive series of feeder bowls. Thus each motor in the series may be accurately tuned to a natural period of vibration commensurate with the load it is to handle and it is unnecessary to add weights to the base or change the springs to obtain the proper tuning. Some leaf spring motors of this character are impossible to tune as the weights and sizes of the base and springs are not available. This is not the case of a torsion bar feeder.

Again the torsion bar eliminates the bending load that is ever present in the flexible leaf spring of a circular motor of this type. The torsion bars assume the whole of the spring load and are tuned. However, the arcuate twisting of the circular motor due to the reciprocation being along an inclined arcuate path of movement, is assumed by the connecting links. The connecting arms are necked down to permit them to flex laterally and it is not assumed by the torsion bars in the circular motor.

A leaf spring design of motor requires either a few long heavy springs or a large number of short springs in order to maintain the working stress below the endurance limit of the spring material. On bowl or parts feeders of this character the number of thin leaf springs used is limited by the available space for adequate spring clamping. It is the present practice to employ the smallest number of leaf springs possible to use with sufficient length to maintain the working stress within the allowable limits of endurance. If there is adequate room in a motor of this character in which to clamp the leaf springs, then they can be properly tuned for the use to which they are applied. If on the other hand they cannot be fitted into the space allotted, then it is impossible to build a proper structure. These difficulties are not experienced with a torsion bar motor as the space is adequate for the proper size of torsion bar and the adjustment is finite.

The torsion bar motor requires less power to drive than does the leaf spring unit becaues of the friction loss resulting in the slight movement between the leaf springs. Again the leaf spring clamping bolts are under a bending load. The internal friction loss of each leaf spring is multiplied by the number of leaf springs employed as each spring has tension and compression sections. On the other hand a single torsion bar may take the place of two, four or even more leaf springs and the loss is thus reduced by the reduction of the number of springs employed. Thus the torsion bar motor takes less driving power than that of a leaf spring motor.

Other objects and advantages appear hereinafter in the following description and claims.

The accompanying drawings show for the purpose of exemplification without limiting the invention or claims thereto, certain practical embodiments illustrating the principles of this invention wherein:

Fig. 1 is a view in side elevation of a circular type motor for a feeder bowl having two sets of torsion bars with their clamping sockets on the outer ends of the bars.

Fig. 2 is an enlarged detail view of a connecting arm secured to a torsion bar of square cross section.

Fig. 3 is an enlarged detailed view of a connecting arm secured to a torsion bar of round cross section.

Fig. 4 is an enlarged detailed view illustrating the manner of adjusting the connecting arm to change the tuning of the motor shown in Fig. 1.

Fig. 5 is a graph showing the spring scale vs. the length of a torsion arm.

Fig. 6 is a view in side elevation showing a circular motor having two sets of torsion bars with their clamping sockets disposed on opposite sides of the connecting arm between the torsional bars.

Fig. 7 is a view in side elevation showing a circular motor having two sets of torsion bars with their clamping sockets disposed on the inner ends of the bars.

Fig. 9 is a view in side elevation of a straight feeder motor with a conveyor trough attached.

Fig. 11 is a view in horizontal section taken along the line 11—11 of Fig. 9.

Figure 10:
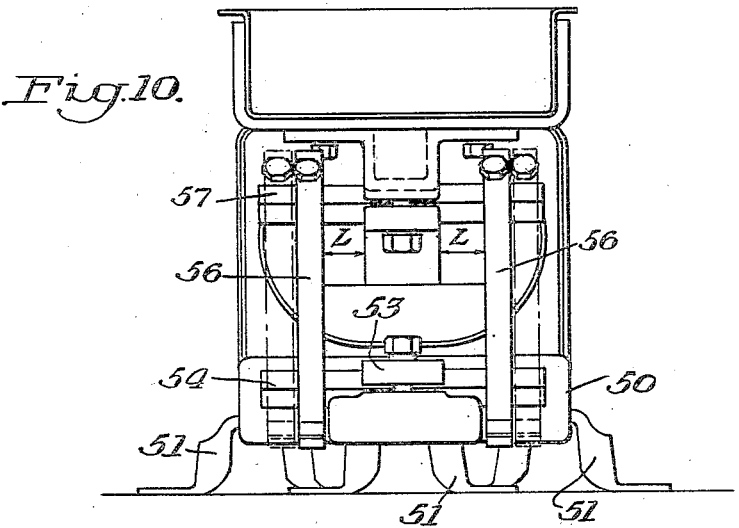
Fig. 10 is an end view of the structure shown in Fig. 9.

Referring to the drawing, in Fig. 1 the torsion bar feeder bowl motor is provided with a massive base 1 supported on the three resilient rubber feet 2 and having a series of four clamping sockets 3 each provided with a base 4 and a cap 5, the cap being held to the base by means of the screws 6 which secure the cap thereto. Intermediate the screws the lower parts of the socket 3 and the cap 5 are provided with notched sockets 7 and 8 for receiving the torsional bar 10 that is square in cross section. The sockets are thus the same shape as the non-round portion of the bar. The bar 10 extends inwardly toward the center 11 of the feeder bowl and has clamped thereto the lower end of the connecting arms 12. Each connecting arm has a socket 13 at its opposite ends which is formed into a clamping socket by means of the slot portion 14 that is held together by means of the bolt 15. The upper socket of the connecting arm is connected to the torsion bar 16 which in turn is secured by means of the clamping sockets 17 to the underside of the mounting frame or mounting plate 18. The upper clamping sockets 17 are constructed in the same manner as the lower sockets.

It will be noted in Fig. 1 that the torsion bars 16 which form the upper series of torsion bars are disposed on lines radial to the axial center 11 which passes through the motor. The motor in this instance is an electromagnetic motor and comprises the armature member 20 and the core member 21, the latter being provided with three legs, the center of which is encircled by the coil member 22 that is arranged to be supplied with a suitable source of pulsating current such as alternating current or pulsating direct current or rectified alternating curent. A suitable contol is placed between the source supplied and the motor so as to enable one to vary the current and voltage to the motor for changing the amplitude of vibration.

The mounting plate 18 is provided with a bowl member 23 which has on its inner surface a spiral track 24 that leads from the bottom of the bowl which is indicated at 25.

On the parts feeder the path of vibration is along an arcuate path transverse to the center line of the connecting arms 12. The movement of the links 12 places a torsion load on the torsion bar springs 16. Since the torsion bar springs 16 are symmetrically disposed about the axial center of the motor the bowl must move in an arcuate path about the vertical axis, which results in a torsion loading of the connecting arms 12. These arms are provided with a reduced section to allow freedom of torsional movement in the arcuate path of vibration without undue strain on the torsion bar sprins 16 or the clamping sockets 3. In the straight feeder there is no torsion in the connecting arms due to the straight line motion so the arms need not have a reduced section.

In place of using a non-round torsion bar such as indicated by the torsion bars of square cross section shown at 10 and 16, one may employ a round torsion bar as indicated at 27 and the connecting arm 28 is provided with a round socket 30 to receive the round bar. A locking key or pin 31 is passed through or driven into the opening 32 through the connecting arm and is provided with a locket set screw 33. If it is desired to adjust the arm the torsion bar may be provided with a series of undulations 34 to receive the locking key 31.

As shown in Fig. 4 the lower sets of torsion bars 10 and 16 are clamped in the lower and upper clamping members 3 and 17 respectively. The connecting arm 12 is adjustable toward or away from the center 11 of the motor by merely loosening the screws 15 and adjusting the arm at the positions illustrated at 35 and 36 and 37. Thus when the connecting arm is located at the position 35 the torsional bars are at their shortest length and when the arms are positioned as indicated in side lines at 36 the torsion bars are at their intermediate position and when the connecting arm is at 37 the torsion bars are at their greatest length. The effect of adjusting these connecting arms in position is illustrated from 35 to 37 in the graph shown in Fig. 5 which is spring scale versus length of arm curve. The units of this curve are units of effective length of the torsion bar from the position as illustrated at 35 to the position as illustrated at 37 and the abscissa are units of effective spring scale obtained through these adjustments. It will be noted that the unit increase in length of L of the torsion bars reduces the effect of spring action.

As illustrated in Fig. 6 the base 1 is provided with a circular series of clamping sockets 40 which support the torsional bars 10 lying in a lower horizontal plane and are carried adjacent the outer perimeter of the base 1. The upper clamping sockets 42 on the underside of the mounting plate 18 are positioned inwardly of the perimeter of the plate 18 and also inwardly of the sockets 40. The torsion bars 16 lie in an upper horizontal plane. The clamping sockets 40 and 42 are symmetrically arranged about the vertical axis 11. In this structure the connecting arms 12 are adjusted in the same manner as previously described, however, it may be necessary to adjust the bars in their sockets as well as to adjust the connecting arms along the torsion bars to properly tune the same. A change in length of one set of torsional bars inversely changes the length of the other set of torsional bars.

In the structure as illustrated in Fig. 7 the lower torsion bars 10 are mounted in the symmetrically positioned socket members 44 which are positioned inwardly of the perimeter of the base and hold the torsion bars 10 in the horizontal plane projecting radially outwardly whereas the upper set of torsional bars 16 are symmetrically supported by the clamping sockets 42 positioned inwardly of the perimeter of the mounting plate 18 as shown in Fig. 6. Thus in this structure the connecting arms 12 are on the outer side of both the lower and upper clamping sockets 40 and 42 and a change in length of one set of torsional bars changes the other set of torsional bars in the same direction.

In Fig. 7 the lower clamping sockets 40 have a dovetailed base 41 fitting in the mating radial slots 43 and held in place by the bolts 49 slidable through radial bolts in the base as shown. The underside of the dovetailed base of the sockets 40 and the bottom of the radial grooves or channels 43 are serrated as indicated at 39 to lock the clamping sockets in place when adjusted. With this adjustment the lengths of both torsion bars may be varied relative to each other to effect a different tuning of the bowl.

Figure 8:
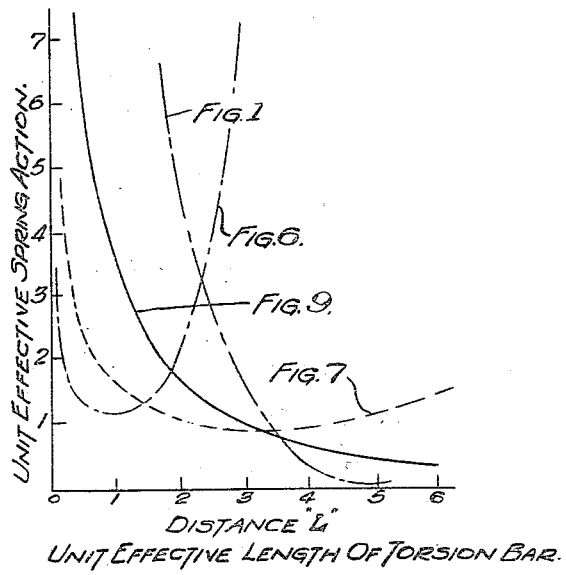
Fig. 8 is a graph showing the spring scale vs. the unit effective length of the torsion bar for the structures illustrated in Figs. 1, 6, 7 and 9.

The curves in Fig. 8 illustrate the relative stiffness of the torsion bar springs, for the arrangements shown in Figs. 1, 6, 7 and 9. Each curve indicates how the spring scale varies with the position of the connecting arm thereby providing a means of tuning the feeder to vibrate at some predetermined natural frequency. This frequency varies from 2 to 8 cycles different from the applied power frequency but preferably above in order to prevent a change in the amplitude of vibration when the material to be conveyed is placed in the bowl or trough. In connection with this the energy required to drive the unit is not affected by the mass of material being conveyed, however, it is dependent upon the energy required to force the feeder to vibrate at the applied power frequency, the amount depending upon the difference between the applied power frequency and the natural frequency of the feeder, plus the internal friction losses of the springs.

Referring now to Fig. 9, the straight feeder motor is provided with the base 50 resiliently supported by the resilient feet 51 and providing clamping sockets 52 and 53 to support the torsion bars 54 and 55 which represent the lower set of bars in this motor. These bars are clamped intermediate of their ends by the clamps 52 and 53 and the connecting arms 56 connect the outer end of the torsion bars 54 and 55 with the outer ends of the torsion bars 57 and 58 which are clamped by the clamping sockets 60 and 61 mounted on the underside of the mounting plate 62 which supports the trough member 63 for feeding material to the right as shown in Fig. 9. The mounting plate 62 is also provided with a depending bracket 64 to support the armature 65 of the electromagnetic motor 66. The electromagnetic motor is provided with a fore member 67 and a field member 68, the fore member 67 being mounted by the bracket 69 and the bolt member 70 to the rear member 71 of the base 50.

The bolts 72 on the connecting arms 56 clamp their respective ends of the connecting arms to the torsional bars. By loosening the bolts 72 and sliding the connecting arms inwardly or outwardly of the clamping members one may accurately tune the feeder by changing the effective length of the torsional bars as illustrated in dotted lines in Fig. 10.

As shown in Fig. 9 the center of gravity of the base unit of the straight feeder is indicated at 73 whereas the center of gravity of the trough unit and mounting plate is indicated at 74. A line connecting the centers of gravity 73 and 74 must be normal to the center line of the connecting arms 56 or the trough will dip or rock and would be difficult to tune and the tuning would change with the loading of the trough. Thus the mounting plate 62 with the trough 63 and the base 50 vibrate in the same plane but opposite directions. The relative magnitude of vibration of the mounting plate with the trough to that of the base depends upon the ratio of the base weight to the weight of the mounting plate and trough.

For best results the ratio of the base weight to the weight of the mounting plate and trough should not be less than 2½:1. Also the weight ratio determines the location of the node "N" shown in Fig. 9 about which the connecting arms 56 oscillate. For example, if the weight ratio is 1:1 then the node "N" would be midway between center line of torsion bar springs or if the base weight is infinite compared to mounting plate and trough weight then the node "N" would lie at the exact center of torsion bars 54 and 55.

This principle is also true of the bowl type parts feeder except that in addition to the minimum ratio of weights of the base to the bowl trough the weight times the radius gyration squared of the base makes this ratio about 3:1.

The node points on the arms 12 or 56 could be employed to support the whole of the device and resilient members would not be needed since theoretically there is no movement at these node points relative to the floor.

As in the case of all torsion motors the cross sectional size of the torsion bars may be changed as well as their effective length to change the tuning of the particular feeder.

It is understood that the invention disclosed herein is not limited in its application to the details of construction and arrangement of parts illustrated in the accompanying drawings, since the invention is capable of other embodiments and of being practiced or carried out in various ways.

I claim:

1. A material handling device member supported by a plurality of springy elements from a resiliently mounted reaction base member and driven by energy impulses to reciprocate the material handling device in an inclined path of movement characterized in that said springy elements include a series of torsion bars joined by an arm to a corresponding series of connections on one of said members, and a corresponding series of sockets on said other member for receiving said torsion bars, said torsion bars and connections are movable to change the effective length of said torsion bars and tune the natural period of vibration of the mechanical vibratory system.

2. The structure of claim 1 characterized in that each connecting arm has a reduced section to permit deflection in a lateral plane.

3. The structure of claim 1 characterized in that said torsion bars are disposed radially to the vertical central axis.

4. The structure of claim 1 characterized in that the axes of said torsion bars are disposed horizontally.

5. The structure of claim 1 characterized in that the axes of said torsion bars lie in common parallel planes.

6. A material handling device comprising a frame to support the material handling device, a series of clamping sockets mounted on the under side of said frame, a torsion bar in each clamping socket, a resiliently supported massive base, a connecting arm clamped to each torsion bar, a second and lower series of clamping sockets mounted on said base with a torsion bar in each clamping socket for receiving the lower end of each connecting arm to secure it relative to said base to support said frame for vibratory reciprocation in an inclined path of movement, said connecting arm being clamped at adjusted positions along said torsion bars to tune the vibratory system of the motor, and driving means mounted to be effective in imparting energy impulses to reciprocate said frame in said inclined path of movement.

7. The structure of claim 6 characterized in that the axes of said torsion bars are disposed horizontally.

8. The structure of claim 6 characterized in that the axes of each series of torsion bars lie in their respective common parallel planes.

9. The structure of claim 6 characterized in that the axes of each series of torsion bars lie in their respective common plane.

10. A material handling device comprising a base, a plate to support the material handling device, a series of corresponding clamping sockets mounted on the plate and the base, a lower set of torsion bars in the clamping sockets on the base, an upper set of torsion bars in the clamping sockets on the plate, drive means mounted to be effective in imparting energy impulses to reciprocate said plate in an inclined path of movement, and connecting arms secured to corresponding pairs of torsion bars to support the plate for vibratory motion.

11. The structure of claim 10 characterized in that each torsion bar extends beyond each side of said clamping sockets to provide in effect two torsion bars each pair of which is joined by connecting arms.

12. The structure of claim 10 characterized in that said arms are attached at each end to said torsion bars and adjustable therealong to tune the natural period of the vibratory system.

13. The structure of claim 10 characterized in that the lower set of torsion bars project from their sockets in the opposite direction than the upper set whereby each connecting arm when adjusted reduces the length of one torsion bar and increases the length of the other torsion bar.

References Cited in the file of this patent

UNITED STATES PATENTS

| | | |
|---|---|---|
| 1,986,102 | Cole | Jan. 1, 1935 |
| 2,241,527 | Schieferstein | May 13, 1941 |
| 2,325,248 | Johnstone | July 27, 1943 |
| 2,638,206 | Musschoot | May 12, 1953 |
| 2,654,466 | Spurlin | Oct. 6, 1953 |
| 2,678,720 | Brumagin | May 18, 1954 |